(12) United States Patent
Grein et al.

(10) Patent No.: US 7,504,455 B2
(45) Date of Patent: Mar. 17, 2009

(54) PROPYLENE POLYMER COMPOSITIONS

(75) Inventors: Christelle Grein, Linz (AT); Klaus Bernreitner, Linz (AT); Friedrich Berger, Linz (AT)

(73) Assignee: Borealis Technology OY, Porvoo (FI)

( * ) Notice: Subject to any disclaimer, the term of this patent is extended or adjusted under 35 U.S.C. 154(b) by 284 days.

(21) Appl. No.: 11/597,802

(22) PCT Filed: May 23, 2005

(86) PCT No.: PCT/EP2005/005561

§ 371 (c)(1),
(2), (4) Date: Dec. 28, 2006

(87) PCT Pub. No.: WO2005/118712

PCT Pub. Date: Dec. 15, 2005

(65) Prior Publication Data

US 2008/0033104 A1 Feb. 7, 2008

(30) Foreign Application Priority Data

May 27, 2004 (EP) .................................. 04102338

(51) Int. Cl.
*C08L 23/16* (2006.01)
(52) U.S. Cl. ........................ 524/528; 524/515; 525/185; 525/191; 525/240
(58) Field of Classification Search .................. 524/240
See application file for complete search history.

(56) References Cited

U.S. PATENT DOCUMENTS

| 3,300,459 | A | 1/1967 | Natta et al. |
| 5,310,584 | A | 5/1994 | Jacoby et al. |
| 5,919,877 | A | 7/1999 | Tanaglia |
| 2004/0044107 | A1 | 3/2004 | Kikuchi et al. |
| 2004/0092631 | A1* | 5/2004 | Joseph ........................ 524/230 |

FOREIGN PATENT DOCUMENTS

| DE | 1188279 | 3/1965 |
| DE | 19754061 | 6/1999 |
| EP | 006090 | 9/1982 |
| EP | 0277514 | 8/1988 |
| EP | 0682066 | 11/1995 |
| EP | 0831125 | 3/1998 |
| EP | 1344793 | 9/2003 |

* cited by examiner

*Primary Examiner*—Marc S Zimmer
*Assistant Examiner*—John Uselding
(74) *Attorney, Agent, or Firm*—Jordan and Hamburg LLP

(57) ABSTRACT

The invention relates to propylene polymer compositions comprising 45-79 parts per weight of a propylene homo- or copolymer, 10-27 parts per weight of a first elastomeric ethylenepropylene copolymer, 5-22 parts per weight of a second elastomeric ethylene-propylene copolymer, 1-15 parts per weight of an elastomeric ethylene-1-octene copolymer and 5-15 parts per weight of inorganic filler. The propylene polymer compositions are suitable for injection molding of large articles, which do not show flow marks and which have a good impact strength/stiffness ratio.

12 Claims, No Drawings

PROPYLENE POLYMER COMPOSITIONS

BACKGROUND OF THE INVENTION

The present invention relates to a propylene polymer composition which is suitable for injection moulding of large articles. More particularly the polypropylene composition can be injection moulded into shaped articles, for example for automotive applications, especially bumpers, which have improved surface properties, particularly a reduced occurrence of flow marks. The inventive propylene polymer compositions are especially suited for the automotive applications because they have excellent impact strength/stiffness balance, high flowability and are not susceptible to the occurrence of flow marks.

Polypropylene resins are normally crystalline arid have low impact resistance, especially at low temperatures. To improve the impact resistance, polypropylene can be blended with polyethylene or ethylene copolymers and rubber-like material, such as polyisobutylene, polybutadiene or ethylene-α-olefin based copolymers.

Normally the resins are then injection moulded into the desired articles. If the articles are relatively large, such as for example automobile bumpers, instrument panels or centre-consoles, the problem of optical irregularity arises, due to the necessary long flow paths of the resin.

Such surface defects, which are also known as flow marks, tiger stripes or flow lines, are deteriorating the surface aesthetics since they manifest, during injection moulding, as a series of alternating high and low gloss strips perpendicular to the direction of the melt flow.

Many attempts to avoid these surface defects, while keeping a good balance of other physical properties, have been made, e.g. DE 19754061. It has however been found, that either the occurrence of flow marks could not be entirely prevented, or the physical properties of the polymer compositions were unsatisfactory.

It is therefore the object of the invention, to provide a propylene polymer composition, which can be injection moulded into large articles, which articles show no flow marks and which composition simultaneously shows a good impact strength/stiffness balance.

The new compositions shall be used for injection moulding, therefore the MFR of the compositions is preferred to be $\geq 5$ g/10 min. A Charpy notched impact strength according to ISO 179/1 eA at +23° C. of $\geq 10.0$ kJ/m$^2$, better of $\geq 12$ kJ/m$^2$ and, still better, of $\geq 13.0$ kJ/m$^2$ is considered as good impact strength. The minimum value for the Charpy notched impact strength according to ISO 179/1 eA at −20° C. is $\geq 4.0$ kJ/m$^2$. Stiffness is considered to be high with tensile moduli according to ISO 527-3 of $\geq 1200$ MPa. Still higher values are of course more preferable. The surface quality of injection moulded parts, which is determined according to the procedure described in the experimental section, must be "excellent", i.e. only polymer compositions which can be injection moulded without showing any flow marks, solve the problem which is underlying the present invention.

SUMMARY OF THE INVENTION

The above object was achieved with a propylene polymer composition comprising

A) 45-79 parts per weight of a propylene polymer comprising a propylene homopolymer and/or a propylene copolymer with up to 10 mol % of ethylene and/or one or more $C_4$-$C_8$ α-olefins, the propylene polymer having an MFR$\geq$80 g/10 min, B) 10-27 parts per weight of an elastomeric ethylene-propylene copolymer having an intrinsic viscosity IV of $\geq 2.4$ dl/g and an ethylene content of at least 75 mol %, C) 5-22 parts per weight of an elastomeric ethylene-propylene copolymer having an intrinsic viscosity IV of 4.0-6.5 dl/g and an ethylene content of up to 70 mol %, D) 1-15 parts per weight of an elastomeric ethylene-1-octene copolymer having an ethylene content of at least 80 mol % and having a melt index MI (190° C., 2.16 kg) of 3-100 g/10 min and E) 5-15 parts per weight of inorganic filler.

The propylene polymer A used for the propylene polymer composition according to the invention is either a propylene homopolymer or a propylene copolymer or mixtures thereof. In the cases where the propylene polymer comprises a propylene copolymer, the copolymer contains up to 10 mol % of ethylene and/or one or more $C_4$-$C_8$ α-olefins, preferably up to 5 mol % of comonomers. Among possible comonomers, ethylene and 1-butene are preferred.

For achieving injection moulded parts free of flow marks, it is essential, that the MFR of propylene polymer A is $\geq 80$ g/10 min.

It is also essential for the present invention, that an elastomeric ethylene-propylene copolymer B having high ethylene content $\geq 75$ mol % and low intrinsic viscosity $\leq 2.4$ dl/g and a further elastomeric ethylene-propylene copolymer C having low ethylene content $\leq 70$ mol % and high intrinsic viscosity of 4.0-6.5 dl/g are present.

A further essential component of the present invention is an elastomeric ethylene-1-octene copolymer having an ethylene content of at least 80 mol %. For achieving injection moulded parts free of flow marks it is important for the ethylene-1-octene copolymer to have a melt index MI (190° C., 2.16 kg) of 3-100 g/10 min. Smaller melt indices do not result in flow mark free parts; with higher indices the mechanical properties of the compositions, in particular stiffness and heat deflection temperature are not sufficient.

Finally, the propylene polymer composition of the present invention comprises a filler, in particular an inorganic filler. Suitable inorganic fillers are talc, chalk, clay, mica, clay or glass fibres and carbon fibres up to a length of 6 mm. Preferably, talc is used.

According to a preferred embodiment, the propylene polymer composition comprises A) 50-65 parts per weight of a propylene polymer comprising a propylene homopolymer and/or a propylene copolymer with up to 10 mol % of ethylene and/or one or more $C_4$-$C_8$ α-olefins, the propylene polymer having an MFR$\geq$80 g/10 min, B) 10-23 parts per weight of an elastomeric ethylene-propylene copolymer having an intrinsic viscosity IV of $\leq 2.2$ dl/g and an ethylene content of at least 80 mol %

C) 5-15 parts per weight of an elastomeric ethylene-propylene copolymer having an intrinsic viscosity IV of 4.0-6.5 dl/g and an ethylene content of up to 70 mol %

D) 3-10 parts per weight of an elastomeric ethylene-1-octene copolymer having an ethylene content of at least 80 mol % and having a melt index MI (190° C., 2.16 kg) of 3-50 g/10 min and E) 5-15 parts per weight of inorganic filler.

The above combination of propylene polymer, elastomeric copolymers and filler is preferred for especially high levels of impact strength/stiffness levels, combined with absolutely flow mark free injection moulded parts.

For the propylene polymer compositions of the present invention it is preferred that they contain from 0.01-2 parts per weight of nucleating agents, preferably α-nucleating agents.

The addition of α-nucleating agents to propylene polymers increases their stiffness. α-nucleating agents are therefore added for a high absolute level of stiffness.

Suitable α-nucleating agents include talc having a particle size of 0.01-1.0 μm, sodium benzoate, sodium-2,2'-methylene-bis(4,6-di-t-butylphenyl)phosphate, sodium-bis(4-t-butylphenyl)phosphate, 1,3,2,4-di(3',4'-dimethylbenzylidene) sorbitol and "ADK STAB NA21E" available from Asahi Denka Kogyo (Japan).

If talc is used as nucleating agent, it is usually present in an amount of 0.01-1.0 wt %, which is an effective amount for α-nucleating, but which is not a sufficient amount where talc would already act as filler.

According to a preferred embodiment, the elastomeric ethylene-propylene copolymer B has an ethylene content of 80-97 mol %.

According to a still further embodiment, the elastomeric ethylene-propylene copolymer C has an ethylene content of 43-70 mol %.

According to an embodiment of the present invention, the propylene polymer A is a propylene homopolymer having an isotacticity IRτ of ≧0.980, preferably of 0.980-0.995.

The IRτ of a propylene polymer is determined by Infrared spectroscopy and calculated as described in EP 0 277 514 A2 on page 3 (especially column 3, line 37 to column 4, line 30) and page 5 (column 7, line 53 to column 8, line 11).

Propylene polymers having high isotacticity are advantageous because of their high stiffness.

The propylene polymer compositions of the present invention are preferably produced by mixing A) 45-79 parts per weight of a propylene polymer comprising a propylene homopolymer and/or a propylene copolymer with up to 10 mol % of ethylene and/or one or more $C_4$-$C_6$ α-olefins, the propylene polymer having an MFR≧80 g/10 min, B) 10-27 parts per weight of an elastomeric ethylene-propylene copolymer having an intrinsic viscosity IV of ≦2.4 dl/g and an ethylene content of at least 75 mol %, C) 5-22 parts per weight of an elastomeric ethylene-propylene copolymer having an intrinsic viscosity IV of 4.0-6.5 dl/g and an ethylene content of up to 70 mol %, D) 1-15 parts per weight of an elastomeric ethylene-1-octene copolymer having an ethylene content of at least 80 mol % and having a melt index MI (190° C., 2.16 kg) of 3-100 g/10 min and E) 5-15 parts per weight of inorganic filler, melting and homogenising and cooling and pelletising the mixture.

The propylene polymer compositions of the present invention are preferably produced by combining the propylene polymer A in the form of powder or granules, the elastomeric copolymers B, C and D and one or more inorganic fillers in a melt mixing device.

Melt mixing devices suited for this process are discontinuous and continuous kneaders, twin screw extruders and single screw extruders with special mixing sections and co-kneaders. The residence time must be chosen such that a sufficiently high degree of homogenisation is achieved.

Production of Propylene Polymer A

The propylene polymer may be produced by single- or multistage process polymerisation of propylene or propylene and α-olefin and/or ethylene such as bulk polymerisation, gas phase polymerisation, slurry polymerisation, solution polymerisation or combinations thereof using conventional catalysts. A homo- or copolymer can be made either in loop reactors or in a combination of loop and gas phase reactor. Those processes are well known to one skilled in the art.

A suitable catalyst for the polymerisation of the propylene polymer is any stereospecific catalyst for propylene polymerisation which is capable of polymerising and copolymerising propylene and comonomers at a temperature of 40 to 110° C. and at a pressure from 10 to 100 bar. Ziegler Natta catalysts as well as metallocene catalysts are suitable catalysts.

One skilled in the art is aware of the various possibilities to produce propylene homo- and copolymers and will simply find out a suitable procedure to produce suitable polymers which are used in the present invention.

Production of Elastomeric Copolymers B and C

An ethylene propylene elastomeric copolymer may be produced by known polymerisation processes such as solution, suspension and gas-phase polymerisation using conventional catalysts. Ziegler Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, H used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene elastomeric copolymers is also described in detail in e.g. U.S. Pat. Nos. 3,300, 459, 5,919,877, EP 0 060 090 A1 and in a company publication by EniChem "DUTRAL, Ethylene-Propylene Elastomers", pages 1-4 (1991).

Alternatively, elastomeric ethylene-propylene copolymers, which are commercially available and which fulfil the indicated requirements, can be used.

Alternatively, polymers A, B and C may be produced in a series of reactors, e.g. starting with the production of polymer A in a loop reactor, transferring the product into a first gas phase reactor, where copolymer B is polymerised and finally transferring the product of the first two reactors into a second gas phase reactor, where copolymer C is polymerised.

Production of Elastomeric Copolymers D

The production of elastomeric ethylene-1-octene copolymers is described in detail in: Chum S P, Kao C I and Knight G W: *Structure, properties and preparation of polyolefins produced by single-site technology*. In: Metallocene-based Polyolefins—Volume 1, Scheirs J and Kaminsky W Eds, John Wiley and Sons Ltd, Chichester (West Sussex, England), 2000 pp. 262-264.

Alternatively, elastomeric ethylene-1-octene copolymers, which are commercially available and which fulfil the indicated requirements, can be used.

The propylene polymer compositions of the present invention are preferably used for injection moulding of large parts, especially for the production of automobile interior and exterior parts, in particular bumpers, instrument panels and centre-consoles.

Measurement Methods

MFR

The melt flow rates were measured with a load of 2.16 kg at 230° C. for polypropylene and at 190° C. for polyethylene. The melt flow rate is that quantity of polymer in grams which the test apparatus standardised to ISO 1133 extrudes within 10 minutes at a temperature of 230° C. or 190° C. respectively, under a load of 2.16 kg.

Comonomer contents were measured with Fourier transform infrared spectroscopy (FTIR) calibrated with $^{13}$C-NMR.

Intrinsic Viscosity

Intrinsic Viscosity was measured according to DIN ISO 1628-1 (October 1999) in Decalin at 135° C.

Charpy Notched Impact Strength

The Charpy notched impact strength (NIS) was determined according to ISO 179/1 eA at 23° C. and at −20° C. by using injection moulded test specimens as described in EN ISO 1873-2 (80×10×4 mm).

Tensile Test

Tensile test was performed according to ISO 527-3 using injection moulded specimens as described in EN ISO 1873-2 (dog bone shape, 3 mm thickness). Tensile modulus (E-modulus) was also determined according to ISO 527-3 and calculated from the linear part of the tensile test results.

Surface Quality

Occurrence of flow marks was evaluated visually using injection moulded plaques (210×148×3 mm, injection time: 1 sec, melt temperature: 240° C., mould temperature: 30° C., hold time: 20 s, cooling time: 20 s hold pressure: from 55 to 10 bars in 10 steps). "Excellent" refers to plaques without any flow marks over the entire plaque surface. "Insufficient" refers to plaques having flow marks.

Shrinkage

Shrinkage was measured according to an internal standard using 150×80×2 mm injection moulded plaques. Measurements were performed at least 96 h after injection in the flow direction and perpendicular to the flow direction. Following conditions were used for injection moulding: injection time: 3 s, melt temperature: 240° C., mould temperature: 50° C., hold pressure: from 73 to 23 bars in 10 steps, hold time: 10 s, cooling time: 20 s).

DETAILED DESCRIPTION OF THE INVENTION

EXAMPLES

Preparation of Propylene Polymers A

The propylene polymers A used for the present invention were prepared according to the following procedure:
Raw Materials:
Hexane dried over molecular sieve (3/10 A)
TEAL: 93% from sigma-Aldrich
Donor Dicyclopentyldimethoxysilane: ex Wacker Chemie (99%).

$N_2$: supplier AGA, quality 5.0; purification with catalyst BASF R0311, catalyst G132 (CuO/ZNO/C), molecular sieves (3/10 A) and P205.
Propylene: polymerisation grade
Hydrogen: supplier AGA, quality 6.0
The catalyst ZN104 is commercially available from Basell.
Sandostab P-EPQ is commercially available from Clariant.

A 20 l autoclave reactor has been purified by mechanical cleaning, washing with hexane and heating under vacuum/$N_2$ cycles at 160° C. After testing for leaks with 30 bar $N_2$ over night reactor has been vacuumed and filled with 5250 g propylene by weighing and 85.4 nl $H_2$ by pressure monitoring from a 50 l steel cylinder.

80 mg of ZN104-catalyst are activated for 5 minutes with a mixture of Triethylaluminium (TEAl; solution in hexane 1 mol/l) and Dicyclopentyldimethoxysilane as donor (0.3 mol/l in hexane)—in a molar ratio of 4 after a contact time of 5 min—and 10 ml hexane in a catalyst feeder. The molar ratio of TEAl and Ti of catalyst is 250. After activation the catalyst is spilled with 250 g propylene into the stirred reactor with a temperature of 23° C. Stirring speed is hold at 250 rpm. After 6 min prepolymerisation at 23° C. temperature is increased to 70° C. in about 14 min. After holding that temperature for 1 hour polymerisation is stopped by flashing propylene and cooling to room temperature.

After spilling the reactor with $N_2$ the homopolymer powder is transferred to a steel container and stabilized with 0.1 w % of Sandostab P-EPQ and 0.2 w % of Ionol in acetone and dried over night in a hood and additionally for 2 hours at 50° C. under vacuum.

The amount of polymer powder (P1) was 17269 and the MFR(230° C., 2.16 kg) was 100 g/10 min.

The following homopolymers were prepared analogously according to the above procedure:

| polymer No. | MFR [g/10 min] |
| --- | --- |
| P1 | 87 |
| P2 | 97 |
| P3 | 96 |
| P4 | 100 |
| P5 | 60 |
| P6 | 98 |

Preparation of Elastomeric Copolymers B and C

The elastomeric copolymers of the present invention were prepared according to the following procedure:

A 5 l-reactor (autoclave) filled with about 0.2 barg propylene (polymerisation grade) is pressured up with 0.4 barg $H_2$. Then 300 g of propylene are added.

5 mg of a ZN104 catalyst is contacted with 0.3 ml white oil for about 16 hours and then activated for 5 minutes with a mixture of Triethylaluminium (TEAl; solution in hexane 1 mol/l) and Dicyclopentyidimethoxysilane as donor (0.3 mol/l in hexane)—in a molar ratio of 76 using a contact time of 5 min. The molar ratio of TEAl and Ti of catalyst was 380 and TEAl concentration in TEAVdonor mixture 12.6 mg/ml hexane. After activation the catalyst is transferred to the reactor by spilling in with 500 g propylene. After 12 min pre-polymerisation at 30° C. 60 g of ethylene is added to the reactor and the temperature is increased to 55° C. During heating up additional ethylene dosing is started to achieve the pressure of 29.1 barg at 55° C. Total pressure is hold constantly via continuously dosing of ethylene during polymerisation. 30 min after end of prepolymerisation the reaction is stopped by flashing of monomers and cooling.

The amount of polymer powder was 236 g.

The polymer is stabilized with 0.1 wt % of Sandostab P-EPQ and 0.2 wt % of Ionol in acetone and dried over night in a hood and additionally for 2 hours at 50° C. under vacuum.

The resulting rubber copolymer (R9) has an intrinsic viscosity of 4.41 dl/g and an ethylene content of 38.8 wt %.

The following elastomeric ethylene-propylene copolymers were prepared according to the above procedure, except that $H_2$ and ethylene amounts were varied to achieve different intrinsic viscosities and comonomer concentrations.

| polymer No. | i.V. [dl/g] | C2 [wt %] |
|---|---|---|
| R1 | 1.83 | 83.9 |
| R2 | 2.01 | 79.7 |
| R3 | 1.85 | 79.1 |
| R4 | 2.19 | 80.3 |
| R5 | 1.94 | 94.1 |
| R6 | 2.01 | 82.2 |
| R7 | 2.75 | 82.4 |
| R8 | 3.12 | 70.8 |
| R9 | 4.41 | 38.8 |
| R10 | 4.66 | 34.7 |
| R11 | 4.90 | 59.9 |
| R12 | 4.22 | 55.7 |
| R13 | 6.10 | 56.0 |
| R14 | 4.66 | 46.7 |
| R15 | 3.63 | 69.0 |
| R16 | 2.27 | 36.3 |

Elastomeric Copolymers D

The elastomeric ethylene-1-octene copolymers D which are used for the present invention are selected among commercially available copolymers.

The following elastomers were used in the examples:

| polymer No. | comonomer | comonomer content [wr %] | Melt Index (190° C., 2.16 kg) [g/10 min] | density [g/cm³] |
|---|---|---|---|---|
| EG8100 | Elast01 | octene | 38 | 1.0 | 0.870 |
| EG8180 | Elast02 | octene | 42 | 0.5 | 0.863 |
| EG8200 | Elast03 | octene | 38 | 5.0 | 0.870 |
| EG8400 | Elast04 | octene | 40 | 30.0 | 0.870 |

The elastomers EG8100, EG8180, EG8200 and EG8400 are available as Engage® 8100, Engage® 8180, Engage® 8200 and Engage® 8400 from DuPont Dow Elastomers L.L.C.

The inorganic filler, which was used in the examples was unmodified talc (Luzenac A7) commercially available from Talc de Luzenac S.A.

For each of the examples (E1 to E5, CE1 to CE7), one of the propylene homopolymers P1 to P6, two of the elastomeric ethylene-propylene copolymers R1 to R16, one of the elastomeric ethylene-1-octene copolymers Elast01 to Elast04, an amount of inorganic filler, and conventional additives (0.1% NA11, 0.05% Hydrotalcite, 0.1% Irgafos 168, 0.1% Irganox 1010, 0.05% Ca-stearate, 0.3% Glycerol monostearate, 2% PP3638) were mixed in an intensive mixer (Henschel mixer) for 25 seconds. The compositions were then compounded in a twin screw extruder at a temperature of 250° C. The strands were quenched in cold water and pelletised.

NA11 is the grade name of the α-nucleating agent sodium 2,2'-methylene bis-(4,6-di-tert. butylphenyl) phosphate) which is available from Asahi Denka Kogyo (Japan). PP3638 is a carbon black masterbatch containing 50 wt % carbon black and 50% propylene homopolymer (MFR (230° C., 10 kg)=2 to 12 g/10 min).

The amounts of each component and the results of the measurements are shown in Tables 1 and 2.

TABLE 1

| | component A | | component B | | component C | | component D | | component E | | component F | |
|---|---|---|---|---|---|---|---|---|---|---|---|---|
| | type | amount [wt %] | type | amount [wt %] | type | amount [wt %] | type | amount [wt %] | type | amount [wt %] | amount [wt %] | |
| E1 | P1 | 54.4 | R1 | 13.6 | R9 | 12.3 | Elast03 | 7 | talc | 10 | 2.7 | Influence of MFR |
| CE1 | P5 | 53.8 | R5 | 13.7 | R13 | 12.8 | Elast03 | 7 | talc | 10 | 2.7 | of component A |
| CE2 | P1 | 59.2 | R1 | 14.7 | R9 | 13.4 | — | — | talc | 10 | 2.7 | Influence of |
| E2 | P1 | 54.4 | R1 | 13.6 | R9 | 12.3 | Elast04 | 7 | talc | 10 | 2.7 | elastomer (MI) |
| E1 | P1 | 54.4 | R1 | 13.6 | R9 | 12.3 | Elast03 | 7 | talc | 10 | 2.7 | |
| CE3 | P1 | 54.4 | R1 | 13.6 | R9 | 12.3 | Elast01 | 7 | talc | 10 | 2.7 | |
| CE4 | P1 | 54.4 | R1 | 13.6 | R9 | 12.3 | Elast02 | 7 | talc | 10 | 2.7 | |
| E1 | P1 | 54.4 | R1 | 13.6 | R9 | 12.3 | Elast03 | 7 | talc | 10 | 2.7 | Influence of ratio of |
| E3 | P2 | 53.9 | R2 | 16.4 | R10 | 10 | Elast03 | 7 | talc | 10 | 2.7 | components B/C |
| CE5 | P1 | 52.1 | R6 | 9.6 | R14 | 18.6 | Elast03 | 7 | talc | 10 | 2.7 | |
| E2 | P1 | 54.4 | R1 | 13.6 | R9 | 12.3 | Elast04 | 7 | talc | 10 | 2.7 | Influence of IV of |
| CE6 | P1 | 54.1 | R7 | 13.8 | R15 | 13.4 | Elast04 | 6 | talc | 10 | 2.7 | components B and C |
| E4 | P3 | 51.9 | R3 | 18.9 | R11 | 11.5 | Elast04 | 5 | talc | 10 | 2.7 | |
| CE7 | P6 | 50.6 | R8 | 17.7 | R16 | 12 | Elast04 | 7 | talc | 10 | 2.7 | |
| E5 | P4 | 52.7 | R4 | 15.6 | R12 | 12 | Elast04 | 7 | talc | 10 | 2.7 | |

TABLE 2

| | MFR [g/10 min] | Surface Quality | NIS (23° C.) kJ/m² | NIS (−20° C.) kJ/m² | E-Modulus [MPa] | Shrinkage [%] | |
|---|---|---|---|---|---|---|---|
| E1 | 14.5 | excellent | 24.9 | 5.4 | 1321 | 0.62/0.71 | Influence of MFR |
| CE1 | 10.2 | insufficient | 38.2 | 5.8 | 1284 | 0.63/0.89 | of component A |
| CE2 | 15.9 | insufficient | 7.9 | 3.9 | 1541 | 0.87/0.97 | Influence of |

TABLE 2-continued

|  | MFR [g/10 min] | Surface Quality | NIS (23° C.) kJ/m² | NIS (−20° C.) kJ/m² | E-Modulus [MPa] | Shrinkage [%] |  |
|---|---|---|---|---|---|---|---|
| E2 | 16.5 | excellent | 13.4 | 5.1 | 1313 | 0.56/0.83 | elastomer (MI) |
| E1 | 14.5 | excellent | 24.9 | 5.4 | 1321 | 0.62/0.71 |  |
| CE3 | 14.2 | insufficient | 17.8 | 5.5 | 1360 | 0.61/0.75 |  |
| CE4 | 13.8 | insufficient | 17.2 | 5.4 | 1381 | 0.64/0.77 |  |
| E1 | 14.5 | excellent | 24.9 | 5.4 | 1321 | 0.62/0.71 | Influence of ratio of |
| E3 | 12.9 | excellent | 47.9 | 5.8 | 1217 | 0.54/0.72 | components B/C |
| CE5 | 11.2 | insufficient | 58.6 | 6.3 | 1180 | 0.69/0.85 |  |
| E2 | 16.5 | excellent | 13.4 | 5.1 | 1313 | 0.56/0.83 | Influence of IV of |
| CE6 | 10.5 | insufficient | 31.8 | 7.3 | 1234 | 0.54/0.76 | components B and C |
| E4 | 12.9 | excellent | 47.9 | 5.8 | 1217 | 0.51/0.8 |  |
| CE7 | 12.7 | insufficient | 43.2 | 5.8 | 1185 | 0.53/0.83 |  |
| E5 | 17.6 | excellent | 50.4 | 6.6 | 1228 | 0.45/0.48 |  |

The invention claimed is:

1. A propylene polymer composition comprising
   A) 45-79 parts per weight of a propylene polymer comprising a propylene homopolymer and/or a propylene copolymer with up to 10 mol % of ethylene and/or one or more $C_4$-$C_8$ α-olefins, the propylene polymer having an MFR≧80 g/10 min,
   B) 10-27 parts per weight of an elastomeric ethylene-propylene copolymer having an intrinsic viscosity IV of ≦2.4 dl/g and an ethylene content of at least 75 mol %,
   C) 5-22 parts per weight of an elastomeric ethylene-propylene copolymer having an intrinsic viscosity IV of 4.0-6.5 dl/g and an ethylene content of up to 70 mol %,
   D) 1-15 parts per weight of an elastomeric ethylene-1-octene copolymer having an ethylene content of at least 80 mol % and having a melt index MI (190° C., 2.16 kg) of 3-100 g/10 min and
   E) 5-15 parts per weight of inorganic filler.

2. A propylene polymer composition, comprising
   A) 50-65 parts per weight of a propylene polymer comprising a propylene homopolymer and/or a propylene copolymer with up to 10 mol % of ethylene and/or one or more $C_4$-$C_8$ α-olefins, the propylene polymer having an MFR≧80 g/10 min,
   B) 10-23 parts per weight of an elastomeric ethylene-propylene copolymer having an intrinsic viscosity IV of ≦2.2 dl/g and an ethylene content of at least 80 mol %,
   C) 5-15 parts per weight of an elastomeric ethylene-propylene copolymer having an intrinsic viscosity IV of 4.0-6.5 dl/g and an ethylene content of up to 70 mol %,
   D) 3-10 parts per weight of an elastomeric ethylene-1-octene copolymer having an ethylene content of at least 80 mol % and having a melt index MI (190° C., 2.16 kg) of 3-50 g/10 min and
   E) 5-15 parts per weight of inorganic filler.

3. A propylene polymer composition according to claim 1 or 2, further comprising 0.01-2 parts per weight of nucleating agent.

4. A propylene polymer composition according to claim 1 or 2, wherein the ethylene content of the elastomeric ethylene-propylene copolymer B is 80-97 mol %.

5. A propylene polymer composition according to claim 1 or 2, wherein the ethylene content of the elastomeric ethylene-propylene copolymer C is 43-70 mol %.

6. A propylene polymer composition according to claim 1 or 2, wherein the propylene polymer A comprises a propylene homopolymer having an isotacticity IRτ of ≧0.980.

7. Process for producing a propylene polymer composition according to claim 1, comprising mixing
   A) 45-79 parts per weight of a propylene polymer comprising a propylene homopolymer and/or a propylene copolymer with up to 10 mol % of ethylene and/or one or more $C_4$-$C_8$ α-olefins, the propylene polymer having an MFR≧80 g/10 min,
   B) 10-27 parts per weight of an elastomeric ethylene-propylene copolymer having an intrinsic viscosity IV of ≦2.4 dl/g and an ethylene content of at least 75 mol %,
   C) 5-22 parts per weight of an elastomeric ethylene-propylene copolymer having an intrinsic viscosity IV of 4.0-6.5 dl/g and an ethylene content of up to 70 mol %,
   D) 1-15 parts per weight of an elastomeric ethylene-1-octene copolymer having an ethylene content of at least 80 mol % and having a melt index MI (190° C., 2.16 kg) of 3-100 g/10 min and
   E) 5-15 parts per weight of inorganic filler, melting and homogenizing and cooling and pelletizing the mixture.

8. A propylene polymer composition according to claim 1 or 2, wherein the nucleating agent comprises α-nucleating agent.

9. A propylene polymer composition according to claim 1, wherein the isotacticity Irτ is 0.980-0.995.

10. Process for producing a propylene polymer composition comprising mixing
    A) 50-65 parts per weight of a propylene polymer comprising a propylene homopolymer and/or a propylene copolymer with up to 10 mol % of ethylene and/or one or more $C_4$-$C_8$ α-olefins, the propylene polymer having an MFR≧80 g/10 min,
    B) 10-23 parts per weight of an elastomeric ethylene-propylene copolymer having an intrinsic viscosity IV of ≦2.2 dl/g and an ethylene content of at least 80 mol %,
    C) 5-15 parts per weight of an elastomeric ethylene-propylene copolymer having an intrinsic viscosity IV of 4.0-6.5 dl/g and an ethylene content of up to 70 mol %,
    D) 3-10 parts per weight of an elastomeric ethylene-1-octene copolymer having an ethylene content of at least 80 mol % and having a melt index MI (190° C., 2.16 kg) of 3-50 g/10 min and
    E) 5-15 parts per weight of inorganic filler,
    melting and homogenizing and
    cooling and palletizing the mixture.

11. An automobile interior or exterior part comprising a composition produced by the process of claim 1 or 2.

12. An automobile interior or exterior part according to claim 11, wherein the part is an automobile bumper or body part.

* * * * *